United States Patent [19]

Piety

[11] Patent Number: 5,461,791
[45] Date of Patent: Oct. 31, 1995

[54] APPARATUS AND METHOD FOR ROTATIONALLY POSITIONING A ROTOR

[75] Inventor: Richard W. Piety, Knoxville, Tenn.

[73] Assignee: Computational Systems, Inc., Knoxville, Tenn.

[21] Appl. No.: 219,110

[22] Filed: Mar. 29, 1994

[51] Int. Cl.$^6$ .............................. G01B 5/24; G01M 1/00
[52] U.S. Cl. .................... 33/1 N; 33/398; 73/66
[58] Field of Search .......................... 33/391, 398, 399, 33/1 N; 73/66, 460, 462, 487

[56] References Cited

U.S. PATENT DOCUMENTS

| | | |
|---|---|---|
| 1,377,720 | 5/1921 | Neff . |
| 1,881,204 | 10/1932 | Lundgren . |
| 1,931,490 | 10/1933 | Fisher . |
| 2,285,965 | 6/1942 | Halstead . |
| 2,601,643 | 6/1952 | Sulger . |
| 2,671,274 | 3/1954 | Greenberger . |
| 2,920,602 | 1/1960 | Post . |
| 2,933,821 | 4/1960 | D'Enis . |
| 3,401,462 | 9/1968 | Korodan . |
| 5,038,489 | 8/1991 | Muehlenbein ............ 33/391 X |
| 5,335,421 | 8/1994 | Jones, Jr. ................. 33/759 X |

FOREIGN PATENT DOCUMENTS 2036987  7/1980  United Kingdom ................ 73/66

OTHER PUBLICATIONS

"Practical Ideas . . . ", American Machininst/Metalworking Manufacturing, vol. 104 No. 6, Mar. 21, 1960, p. 150.
1992 Thomas Register, pp. 138, 748 DASCO PRO Product Brochure.

Empire Product Brochure (no date).

Primary Examiner—Alvin Wirthlin
Attorney, Agent, or Firm—Luedeka, Neely & Graham

[57] ABSTRACT

A method for rotationally positioning a rotor for balancing procedures uses an instrument within a housing that is temporarily mounted to the axial face of a rotor for determining rotational locations with respect to a reference mark located on the rotor. The instrument has a needle indicator which is responsive to gravity, and is mounted such that it can rotate independently of the position of the housing. Tick marks representing degrees are arranged in a circle around the edge of the needle indicator. Two sets of numerical scales are provided, each in a different color, one increasing in a clockwise direction, and the other increasing in a counter clockwise direction. Two arc shaped arrows are provided, one each in the two colors used for the two sets of numerical scales. The color of the arc shaped arrow that points in the direction of incremental rotor rotation indicates that the set of numerical scales printed in the same color should be used for reading the degree of rotation. The method overcomes operator confusion as to the direction in which rotational angles should be measured by associating rotor operational rotation and measured rotational angles with the color coded arrows and color coded numbers on the instrument.

10 Claims, 3 Drawing Sheets

APPARATUS AND METHOD FOR ROTATIONALLY POSITIONING A ROTOR

FIELD OF THE INVENTION

This invention relates to the field of angle indicators, or instruments, and more particularly such devices used for determining the incremental degree of rotation of a rotor, and the methods employed for their use.

BACKGROUND OF THE INVENTION

Because of wear and other effects, rotors, such as fans, turbines, shafts and motors, must be periodically re-balanced so that they can operate more efficiently. As a part of this balancing procedure, the rotor is analyzed to determine where it is out of balance, i.e.—heavy spots are located, and then counterbalancing weight is added to the rotor to restore its balance. As used herein "rotor" is used in a broad sense to mean rotating members.

The location of a heavy spot is determined in reference to an arbitrary mark that is placed on the rotor, and is expressed in units of degrees away from the reference mark. However, while it is easy to communicate a quantity in degrees, it has traditionally been confusing to express that quantity in reference to a rotating shaft.

For example, to express a location as 65° clockwise, there is confusion as to whether rotor must be rotated 65° in a clockwise direction, or the angle measured in a clockwise direction, in order to find the appropriate location. These two methods will locate different heavy spots, and one is wrong. Adding to the confusion is the fact that rotors have two ends, and clockwise rotation at the one end is counter clockwise rotation at the other.

For example, a hot spot may be expressed as "45 degrees against rotation", and there is a tendency to rotate the rotor against rotation, as opposed to measuring the angle against rotation. Typically an operation is performed to locate the heavy spot as an angle measured with regard to a reference mark on the shaft. The measured angle is given as "against rotation" and the operator may interpret this to mean that he should rotate the shaft from the reference mark in a direction against the rotation of the shaft. Of course, if the measured angle was intended to indicate a direction of measurement, as opposed to a direction of rotation, the shaft has been rotated in the wrong direction. Maintenance personnel have difficulty remembering that angles indicated to be against rotation require rotation of the shaft in a "with rotation" direction.

Additional confusion is encountered in referring to directions or locations as being left or right. The direction may be reversed depending on which end of the rotor is used as a reference and depending on whether left or right is referenced at the top or bottom of a horizontal rotor.

A technician who performs rotor balancing procedures daily may establish his own convention, but those who come after him, or work with him, are likely to employ different methods, and may have problems interpreting the information that to him was perfectly clear.

Those who infrequently perform balancing operations may have to spend great amounts of time resolving this problem each time they balance a rotor, not remembering how they had done it previously. Of particular concern is that balancing technicians may decide upon a different method of reference every time they perform a balancing operation, making it impossible to recreate and build upon the work which they have done. The ability to make accurate, consistent and repeatable angular measurements for balancing has become significantly more critical with advances in modern balancing instrumentation. The exact positions of dynamic sensors relative to a fixed reference is key to one-run trim balancing techniques and specialized calculations that are available in state-of-the-art technology.

This invention solves the problem of imprecise rotational direction indication, and provides both the journeyman and layman alike with a consistent and simple device for measuring, and a method for communicating and using, rotational position information.

Additional advantages of the invention will in part be set forth in the description which follows, and in part will appear from the description. The advantages of the invention may be realized and obtained by means of the embodiments particularly pointed out, and also by those embodiments within the spirit of the appended claims.

SUMMARY OF THE INVENTION

The present invention removes the inherent confusion in communicating rotational direction by providing an instrument and method for determining rotational direction.

The instrument includes a housing that has two parallel, opposing faces. A weighted pendulum needle indicator is mounted inside the housing, to the first, or what may also be referred to as the back, face of the housing. The needle indicator has a tip at one end, and is weighted at the other. The needle indicator is rotatably mounted so that it can rotate in response to gravity, the heavier end of the indicator being pulled toward the Earth, and the lighter end pointing up. When the faces of the instrument are substantially vertical, or in other words when they are substantially perpendicular to the surface of the Earth, then the needle indicator will be influenced primarily by gravity alone, and not by the rotational position of the housing.

On the outside of the housing, also mounted to the first face, but on the other side of the face from the needle indicator, is an attachment. The attachment is used for mounting the instrument to the equipment that will be balanced or otherwise tested, in such a way that the instrument may easily be removed when the testing is completed.

The second face of the instrument has a viewport mounted to it. Through the viewport the full rotation of the needle indicator relative to the housing may be observed.

Behind the needle indicator, located on the inside of the first face, is a first set of indicia. The first set of indicia has a first distinguishing characteristic. The indicia can be seen behind the needle indicator as viewed through the viewport. The indicia form a ring. The radius of the ring is approximately equal to the length of the needle indicator as measured from the tip of the needle to the point at which the needle is mounted to the first face. The first set of indicia consists of, for example, 360 tick marks. They are equally spaced around the circumference of the ring which they form.

A second set of indicia, having a second distinguishing characteristic, is also located on the inside of the first face. It is located near the first set of indicia, and it too can be seen behind the needle indicator as viewed through the viewport. The second set of indicia may consist of, for example, black numbers in the form of a scale ranging from 0 to 359 inclusive. These numbers are used to label the tick marks of the first set of indicia.

A third set of indicia, having a third distinguishing characteristic, is also located on the inside of the first face. It is located by the first and second sets of indicia, and it too can be seen behind the needle indicator as viewed through the viewport. The third set of indicia may consist of, for example, red numbers ranging from 0 to 359 inclusive. These numbers are used to label the tick marks of the first set of indicia.

A first arc shaped arrow is located on the viewport. It has the second distinguishing characteristic, which is preferably the color black. The first arc shaped arrow points in a counter clockwise direction. A second arc shaped arrow is also located on the viewport. It has the third distinguishing characteristic, which is preferably the color red. The second arc shaped arrow points in a clockwise direction.

The instrument is used by attaching it to a rotor, preferably, an axial face, or an appendage of an axial face, of a rotor. The housing of the instrument is rotated until the tip of the needle indicator is aligned with the tick mark that is labeled 0 by both the second and third sets of indicia. At this point the rotor may be rotated in either direction. The resultant degree of incremental rotation is determined by reading the value in degrees from the one set of either the second or third sets of indicia that labels the tick mark located closest to the tip of the needle indicator. The decision of which of the second or third sets of indicia should be used is made by choosing that set which has the same distinguishing characteristic as the arc shaped arrow that correctly indicates the direction in which rotor rotation was affected.

In accordance with a preferred embodiment of the method of the present invention, a desired rotational position is determined and achieved using the instrument described above. To begin, a first reference point is determined and indicated on a rotor, such as a rotating shaft. A second stationary reference point is determined and marked at a stationary location adjacent to the rotor near the first reference point, so that the two reference points may be positionally aligned. A desired amount of rotational movement of the rotor is determined, and the operational direction of rotation is then associated with one of the second and third distinguishing characteristics, which is defined as the selected characteristic, such as either the color red or black. For example, the desired direction of rotation may be associated with the color red. In the preferred embodiment, the angular amount and direction of desired rotation is determined by a balancing procedure, whose purpose is to locate a heavy spot on a rotor.

Next, the two reference points are aligned, and the instrument is attached to the rotor with the needle pointing to zero and with the instrument being oriented in a direction perpendicular to the rotor. The rotor is rotated with reference to the instrument by rotating the rotor in either direction. The rotation of the rotor is stopped when the instrument points to the desired angle on the set of indicia having the selected characteristic. For example, the rotation is stopped when the instrument needle points to the desired angle on the red numbers.

These and other features, aspects, and advantages of the present invention will become better understood with reference to the following description and appended claims.

DETAILED DESCRIPTION OF THE INVENTION

Figure 1:
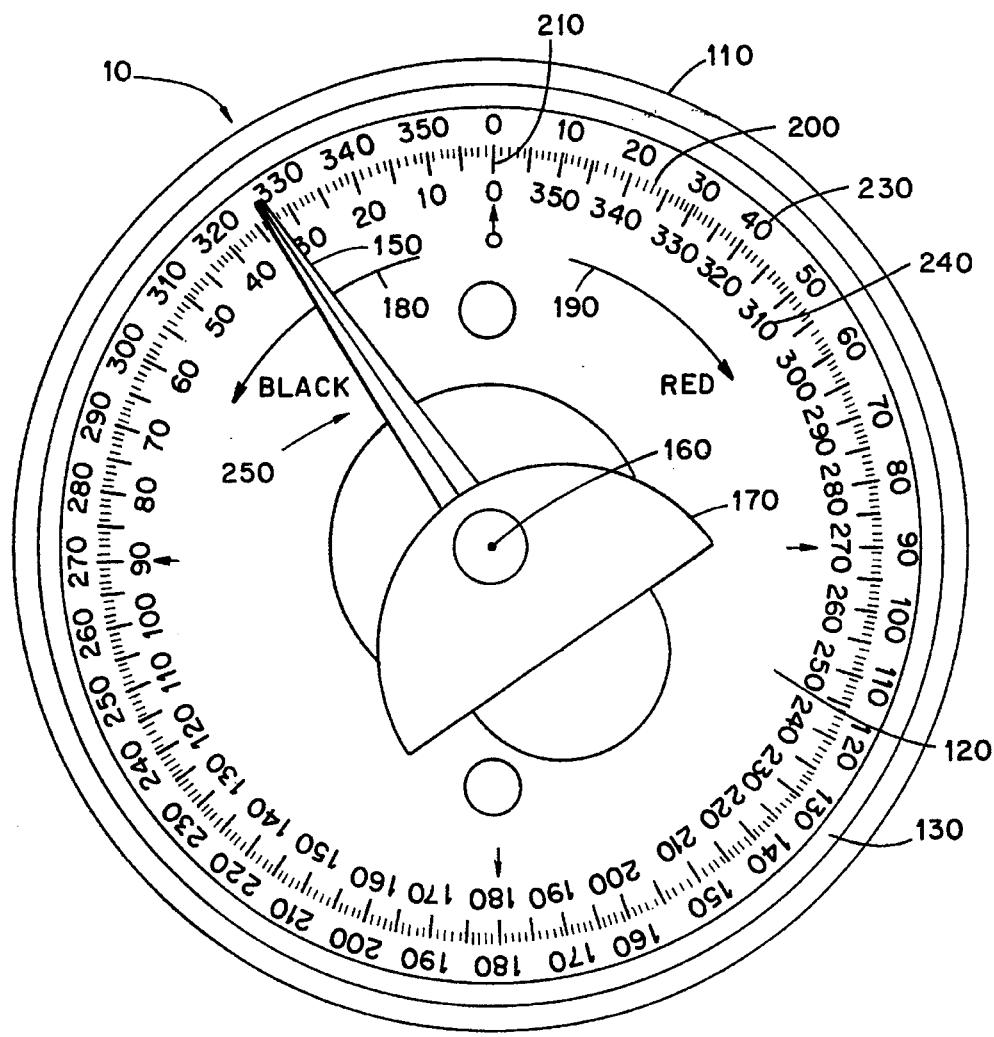
FIG. 1 is a somewhat diagrammatical front view of a preferred instrument of the invention.

Referring now to the drawing in which like reference characters designate like or corresponding parts throughout the several views, there is shown in FIG. 1 an external view of the preferred embodiment of the instrument 10. The instrument is encased within a housing 110 made of a durable material, preferably hard plastic or metal. The housing 110 has two faces, a first face 120, and a second face 130, which are parallel and oppose each other.

A weighted pendulum needle indicator 250 is rotatably mounted within the housing 110 by a mount 160 which connects the needle indicator 250 to the inside of first face 120. The needle indicator 250 has two ends, a needle end 150, and a weighted end 170. The needle indicator 250 is mounted within the housing 110 such that when the two faces 120, 130 are in a substantially vertical orientation, or perpendicular to the surface of the Earth, the needle indicator 250 can rotate on the mount 160, with the weighted end 170 being drawn down toward the Earth by gravity, and the needle end 150 pointing up. The rotation of the needle indicator 250 is substantially unaffected by the rotational position of the housing 110.

Figure 2:
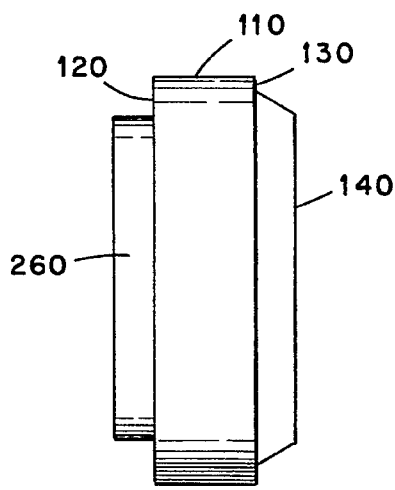
FIG. 2 is a side view of the preferred instrument of the invention.
Figure 4:
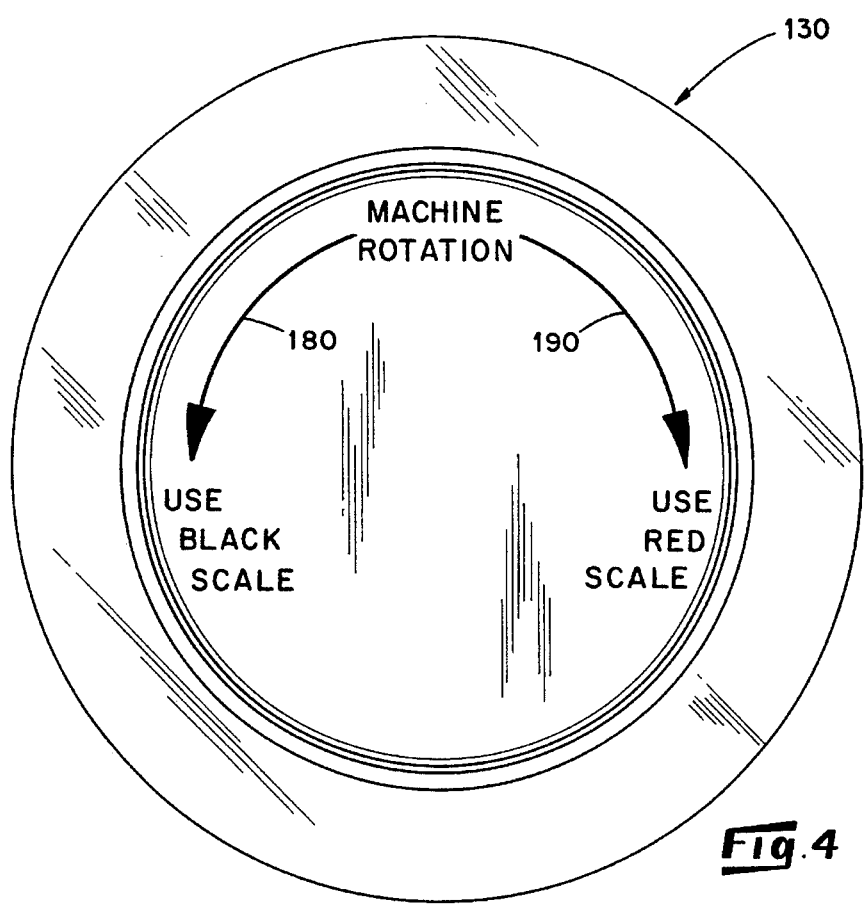
FIG. 4 is a front view of a viewport for the preferred instrument of the invention.

Referring now to FIG. 2, there is shown an attachment means 260 which is mounted to the outside of the first face 120. While the attachment means 260 may take many forms, it is shown in this preferred embodiment as a magnet. There is also shown a viewport 140 which is attached to the second face 130 and is best shown in FIG. 4. While the viewport 140 could be made of any transparent material, in the preferred embodiment it is made of a shatter resistant clear plastic.

Referring back to FIG. 1, there is shown a first set of indicia 200 which is located on the inside of the first face 120, and can be seen behind the needle indicator 250 as viewed through the viewport 140. The first set of indicia 200 contains as many as 360 tick marks, which are equally spaced in the shape of a ring, the radius of which is approximately the same as the distance between the needle indicator mount 160 and the needle end 150 of the needle indicator 250. The first set of indicia 200 has a first distinguishing characteristic. In the preferred embodiment this first distinguishing characteristic is that all the tick marks of the first set of indicia 200 are printed in black ink. In an alternate embodiment, the first distinguishing characteristic could be that all the tick marks of the first set of indicia 200 are made of reflective foil which is attached to the inside of the first face 120.

A second set of indicia 230 is provided, which is located on the inside of the first face 120, and can be seen behind the needle indicator 250 as viewed through the viewport 140. The second set of indicia 230 contains numbers ranging in value from 0 to 359 inclusive. The second set of indicia 230 is used to label the tick marks of the first set of indicia 200. Starting with the number 0, the second set of indicia 230 is spaced around the ring formed by the first set of indicia 200, and increases in value in a clockwise direction. A tick mark 200 located at 3 o'clock is labeled 90 by the second set of indicia 230, a tick mark 200 located at 6 o'clock is labeled 180, and a tick mark 200 located at 9 o'clock is labeled 270. The second set of indicia 230 has a second distinguishing characteristic. In the preferred embodiment this second distinguishing characteristic is that all the numbers of the second set of indicia 230 are printed in black ink. In an alternate embodiment, the second distinguishing characteristic could be that all the numbers of the second set of indicia 230 are relief etched on the inside of the first face 120.

A third set of indicia 240 is provided, which is located on the inside of the first face 120, and can be seen behind the needle indicator 250 as viewed through the viewport 140. The third set of indicia 240 contains numbers ranging in value from 0 to 359 inclusive. The second set of indicia 240 is used to label the tick marks of the first set of indicia 200. That tick mark 210, of the first set of indicia 200, which is labeled 0 by the second set of indicia 230, is also labeled 0 by the third set of indicia 240. Starting with the number 0, the third set of indicia 240 is spaced around the ring formed by the first set of indicia 200, and increases in value in a counter clockwise direction. A tick mark 200 located at 9 o'clock is labeled 90 by the third set of indicia 240, a tick mark 200 located at 6 o'clock is labeled 180, and a tick mark 200 located at 3 o'clock is labeled 270. The third set of indicia 240 has a third distinguishing characteristic. In the preferred embodiment this third distinguishing characteristic is that all the numbers of the third set of indicia 240 are printed in red ink. In an alternate embodiment, the third distinguishing characteristic could be that all the numbers of the third set of indicia 240 are made of raised characters affixed on the inside of the first face 120.

In the preferred embodiment, that tick mark 210 of the first set of indicia 200 which is labeled 0 by the second and third sets of indicia 230, 240, is a bolder mark than any of the other tick marks 200, and those tick marks 220 that are labeled 90, 180, and 270 by the second and third sets of indicia 230, 240, are longer marks than the other tick marks 200.

A first arc shaped arrow 180 is located on or adjacent to the viewport 140. The first arc shaped arrow 180 points in a counter clockwise direction, and has the second distinguishing characteristic, which is the color black in the preferred embodiment.

A second arc shaped arrow 190 is also located on the viewport 140. The second arc shaped arrow 190 points in a clockwise direction, and has the third distinguishing characteristic, preferably the color red.

Figure 3:
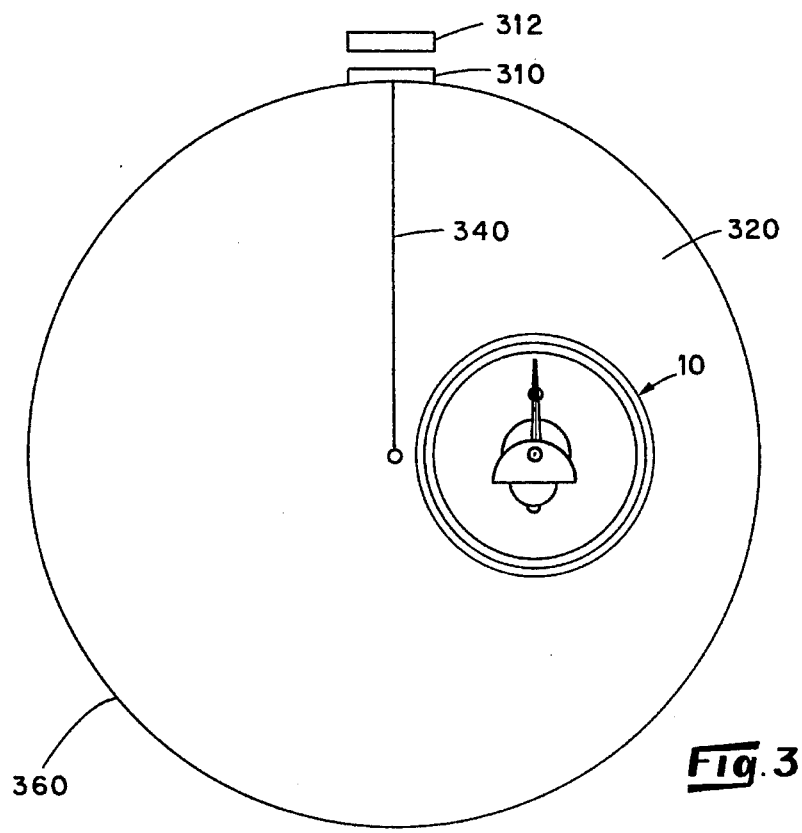
FIG. 3 is a diagrammatical end view of a rotor with the preferred instrument of the invention attached to an axial face of a rotor.

Referring now to FIG. 3, the instrument 10 is used by attaching it to an axial face 320, or an appendage forming an axial face 320, of a rotor 360 having radius 340. It is also permissible to mount the instrument 10 on the side of rotor 360, or on anything that rotates with rotor 10, so long as instrument 10 is substantially perpendicular to the axis of rotation of rotor 360. A reference mark 310, such as reflective tape, is also formed or attached to the rotor 360. In the preferred embodiment of the method, the instrument 10 is attached to the rotor 360 when the reference mark 310 is in the top dead center position adjacent to an external stationary reference mark 312. When the reference mark 310 is in this position, the instrument 10 can be attached anywhere on the axial face 320, and preferably the operator simply rotates the instrument 10 until the needle indicator 250 points to the tick mark 210 labeled "0" by the second and third set of indicia 230, 240. While the instrument 10 is being positioned to indicate zero, the rotor 360 is held stationary with reference marks 310 and 312 in alignment.

If desired, the reference marks 310 and 312 may be located at positions other than top dead center, and the instrument 10 may be initially mounted to indicate a reading other than zero. Of course, any positioning procedure must take into account the starting position of reference marks 310 and 312 and the needle 150. However, to facilitate explanation of the preferred methods, the present discussion assumes initial positioning as described previously.

After the instrument 10 has been attached and the rotor 360 has been positioned to align the reference marks 310 and 312, the rotor 360 may be rotated in either direction. In the preferred embodiment of the method, the rotor 360 is rotated manually. If this is difficult, or impossible to do, the rotor 360 may be jogged using the motive forces that rotate the rotor 360 when operating.

After the rotor 360 has been incrementally rotated, the resultant degree of rotation can be read from the instrument 10. If the reference mark 310 was in the top dead center position, as in the preferred embodiment of the method, then the number of degrees of rotation can be read directly from which ever of the second or third set of indicia 230, 240 that has the same distinguishing characteristic as that arc shaped arrow 180 or 190 which correctly indicates the direction in which the rotor 360 was rotated. In the preferred embodiment, this will be the set of indicia 230, 240 that is printed in the same color as that arc shaped arrow 180 or 190 which correctly indicates the direction in which the rotor 360 was rotated. For example, if the rotor 360 is rotated in the direction of the red arrow 190, the red numbers 240 indicate the angular position of the rotor 360.

Alternate embodiments of instrument 10 may be implemented electronically, have digital displays, and indicate direction by means other than color coding. For example, plus and minus symbols may be used to indicate direction and may constitute the first and second distinguishing characteristics.

Figure 5:
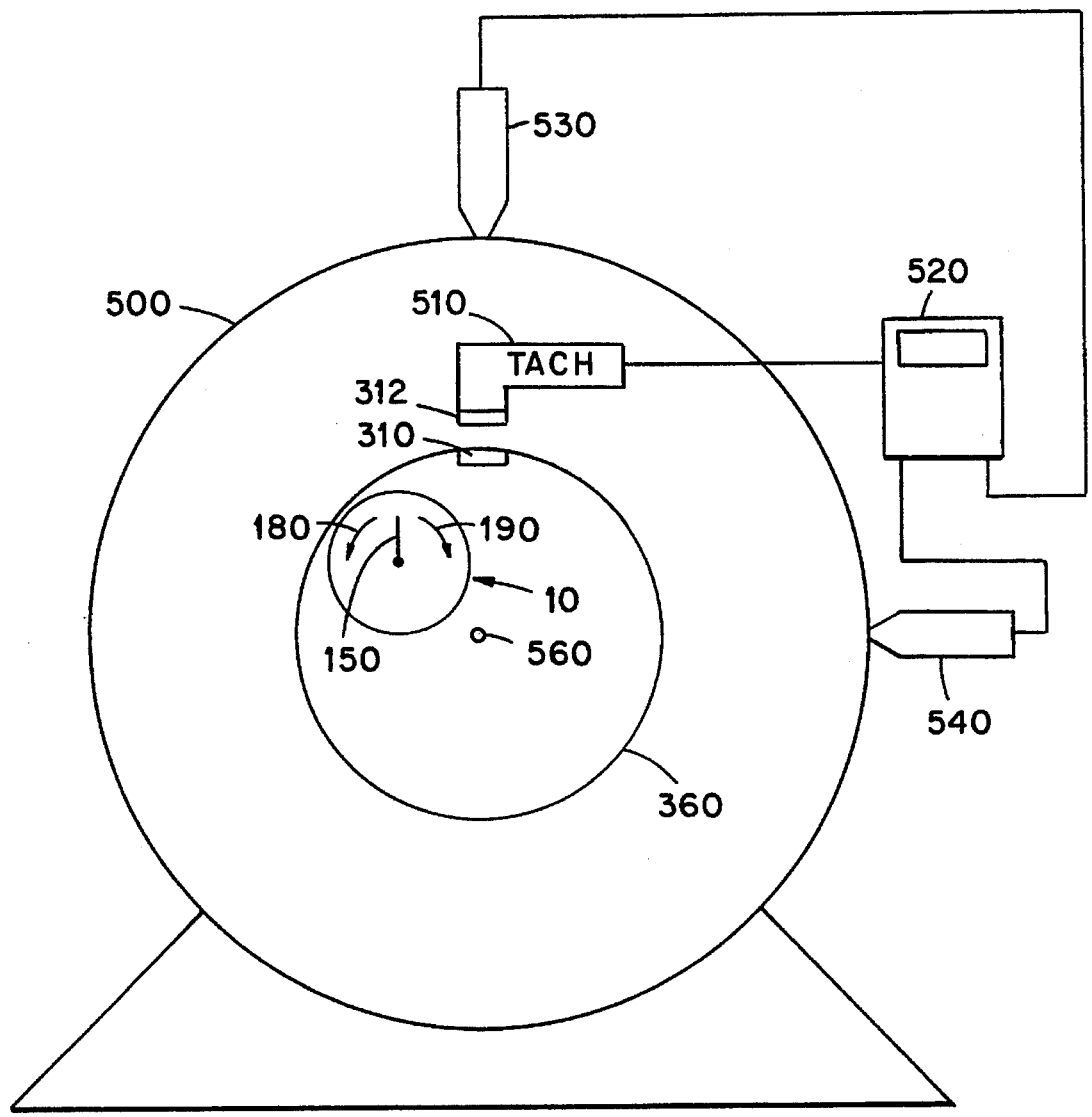
FIG. 5 is a diagrammatical end view of the instrument attached to a rotor of a motor, and it also shows a balancing calculator, vibration sensors and a tachometer.

Having now described the preferred instrument 10, the preferred method of the invention can be described. The objective of the preferred method is to balance a rotor 360, such as a rotating shaft. In FIG. 5 a somewhat diagrammatical end view of a rotor 360 is shown mounted for rotation in a motor housing 500. For clarity of illustration the sizes in FIG. 5 are exaggerated. Preferably the reference mark 310 is provided by a piece of reflective tape and the reference mark 312 is provided by the sensing end of a tachometer 510 located adjacent to the top dead center of the rotor 360. The output signal from the tachometer 510 is supplied to a balancing calculator 520 such as model number 8000 sold by Computational Systems, Inc. The calculator 520 is also connected to receive vibration signals from one or more vibration sensors, in this case vibration sensors 530 and 540.

To begin the method, the instrument 10 is positioned on the rotor oriented perpendicularly to the axis 560 of rotation of the rotor 360, and the direction of operational rotor rotation is noted. In this example the operational rotation is in the direction of the black arrow 180. The instrument 10 is removed, and the shaft is rotated at operational speeds such as by energizing the motor. As the rotor rotates, the tachometer supplies signals to the calculator to indicate instantaneous shaft positions, and the vibration sensors supply signals to the calculator from which it calculates the position of the heavy spot on the rotor and other information not relevant to the present invention. The calculator 520 identifies the heavy spot by indicating an angle. In this case the angle is specified to be against the rotation of the shaft.

The rotor is stopped and the reference marks are aligned. The instrument 10 is mounted (such as by a magnet) on the face of rotor 360 in an orientation perpendicular to axis 560, and the instrument 10 is adjusted in a position to zero the needle 150. Since the rotor 360 was initially noted to rotate in the direction of the black arrow 180 and the calculator 520 provided an against rotation number, the rotor 360 may be rotated by hand in either direction, but the angle is read from the black numbers 230. When the needle 150 points to the black number equal to the number provided by the calculator, the rotor is stopped and the heavy spot is adjacent to the reference mark 312, the sensing end of the tachometer 510. At this point, counter weights are applied to the rotor 360 to attempt to balance it and the process is repeated until the rotor is balanced.

By using instrument 10, the color coded numbers 230 and 240, and the color coded arrows 180 and 190, the confusion is eliminated as to which direction is "against rotation" and whether the angle is measured against rotation or the rotor 360 is rotated against rotation. As previously explained, this problem is pronounced when maintenance personnel use tapes to find the heavy spots, because they are required to remember that angles indicated as against rotation should be measured in a direction with rotation and angles indicated as with rotation should be measured in a direction against rotation, in most systems. However, there is no consistently applied criteria or standard for this balancing procedure. Different balancing text and references use the same nomenclature to have different meanings, which are either explained therein or must be understood from the context in which they are used.

By using the method of the present invention, nomenclature problems are avoided and the task of balancing is simplified from the mathematical viewpoint. The maintenance personnel can concentrate their attention on the elusive and complicated physical problems associated with the task of balancing rotors. While the method of the present invention is particularly well suited for balancing operations, it will be understood by those skilled in the art to apply to other rotational positioning tasks as well.

Although this specification discloses particular embodiments of the invention, these examples merely describe illustrations of the invention. Those skilled in the art may suggest numerous rearrangements, modifications and substitutions of the invention without departing from the spirit of the invention.

Although this specification refers to finding or locating a heavy spot, this is used by example, and it should be understood this invention is equally applicable to locating the light spot, or any other desired angular location.

What is claimed is:

1. A method for rotationally positioning a rotor comprising:

determining and indicating a first reference point on a rotor;

providing a second stationary reference point at a stationary location adjacent to the rotor near the first reference point, so that the two reference points may be positionally aligned;

determining a desired amount and direction of rotational movement of the rotor;

providing an instrument having:
   a housing;
   a rotational indicator mounted in the housing for indicating the amount and direction of rotation of the housing, a first direction being indicated by a first distinguishing characteristic and a second direction opposite to the first direction being indicated by a second distinguishing characteristic;
   an attachment mechanism for removably mounting the housing to the rotor;
   a first arrow pointing in the first direction, disposed adjacent to the rotational indicator and being associated with the first distinguishing characteristic; and
   a second arrow pointing in the second direction, disposed adjacent to the rotational indicator and being associated with the second distinguishing characteristic;

associating the desired direction of rotation with one of the first and second distinguishing characteristics, which is defined as the selected distinguishing characteristic;

rotating the rotor and aligning the two reference points;

attaching the instrument to the rotor with the rotational indicator indicating a selected angle and with the instrument being oriented in a direction perpendicular to the rotor;

rotating the rotor with reference to the instrument by rotating the rotor in the direction indicated by the arrow of the selected distinguishing characteristic; and stopping the rotation of the rotor when the rotational indicator indicates rotation corresponding to the desired angle associated with the selected distinguishing characteristic.

2. A method for locating a heavy position of a rotor that rotates about its axis of rotation and has an operational rotational direction and speed, comprising:

determining and indicating a first reference point on a rotor;

providing a second stationary reference point at a stationary location adjacent to the rotor near the first reference point, so that the two reference points may be positionally aligned;

rotating the rotor at the operational rotational direction and speed;

detecting heavy positions in the rotor and identifying the heavy positions with a desired angle referenced to the first reference point and with a desired direction referenced to the operational rotational direction of the rotor;

providing an instrument having:
   a housing;
   a rotational indicator mounted in the housing for indicating the amount and direction of rotation of the housing, a first direction being indicated by a first distinguishing characteristic and a second direction opposite to the first direction being indicated by a second distinguishing characteristic;
   an attachment mechanism for removably mounting the housing to the rotor;
   a first directional indicator for indicating the first direction, disposed adjacent to the rotational indicator and being associated with the first distinguishing characteristic; and
   a second directional indicator for indicating the second direction, disposed adjacent to the rotational indicator and being associated with the second distinguishing characteristic;

associating the operational rotational direction of the rotor with one of the first and second distinguishing characteristics;

determining a desired orientation of angular measurement with reference to the operational rotational direction of the rotor by associating the desired direction with one of the first and second distinguishing characteristics, which is defined as the selected distinguishing characteristic;

rotating the rotor and aligning the two reference points;

attaching the instrument to the rotor with the rotational indicator indicating a selected angle and with the instrument being oriented in a direction perpendicular to the rotor;

rotating the rotor with reference to the instrument by rotating the rotor in the direction indicated by the directional indicator of the selected distinguishing characteristic; and stopping the rotation of the rotor when the rotational indicator indicates rotation corresponding to the desired angle associated with the selected distinguishing characteristic, whereby the heavy position on the rotor is positioned adjacent to the first reference point.

3. The method of claim 2 wherein said step of detecting heavy positions comprises:

generating a tachometer signal indicating the rotational position and speed of the rotor when operating at operational rotational speed;

generating vibration signals simultaneously with the tachometer signals indicating the vibration of the rotor when operating at operational rotational speed; and analyzing the tachometer signal and the vibration signals with a balancing calculator to calculate the location of the heavy position on the rotor and outputting the location as the desired angle referenced to the first reference point and the desired direction referenced to the operational direction of the rotor.

4. A method for locating a heavy position of a rotor that rotates about its axis of rotation and has an operational rotational direction and speed, comprising:

determining and indicating a first reference point on a rotor;

providing a second stationary reference point at a stationary location adjacent to the rotor near the first reference point, so that the two reference points may be positionally aligned;

rotating the rotor at the operational rotational direction and speed;

detecting heavy positions in the rotor and identifying the heavy positions with a desired angle referenced to the first reference point and with a direction referenced to the operational rotational direction of the rotor;

providing an instrument having:

a housing;

a needle mounted for rotation in the housing about a needle axis for pointing in a fixed direction in response to the force of gravity as the housing is rotated about the needle axis;

a face mounted behind the needle;

a black scale of black numbers disposed in a ring on the face and positioned behind the needle to indicate the amount of rotation of the housing relative to the needle in a first direction of rotation;

a red scale of red numbers disposed in a ring on the face and positioned behind the needle to indicate the amount of rotation of the housing relative to the needle in a second direction of rotation opposite from the first direction;

an attachment mechanism for removably mounting the housing to the rotor;

a black arrow for indicating the first direction and disposed adjacent to the scales; and a red arrow for indicating the second direction and disposed adjacent to the scales;

associating the operational rotational direction of the rotor with red or black by reference to the red and black arrows when the instrument is mounted on the rotor;

determining a desired direction of rotation with reference to the operational rotational direction of the rotor and associating the desired direction with red or black by reference to the red and black arrows when the instrument is mounted on the rotor, which is defined as the selected color;

rotating the rotor and aligning the two reference points;

attaching the instrument to the rotor with the needle pointing to a selected angle and with the instrument being oriented in a direction perpendicular to the rotor;

rotating the rotor; and using the scale of the selected color, stopping the rotation of the rotor when the needle indicates rotation corresponding to the desired angle, whereby the heavy position on the rotor is positioned adjacent to the first reference point.

5. The method of claim 4 wherein said step of detecting heavy positions comprises:

generating a tachometer signal indicating the rotational position and speed of the rotor when operating at operational rotational speed;

generating vibration signals simultaneously with the tachometer signals indicating the vibration of the rotor when operating at operational rotational speed; and analyzing the tachometer signal and the vibration signals with a balancing calculator to calculate the location of the heavy position on the rotor and outputting the location as the desired angle referenced to the first reference point and the direction referenced to the operational direction of the rotor.

6. An instrument for rotationally positioning a rotor that rotates in an operational rotational direction, comprising:

a housing having first and second parallel opposing faces, a weighted pendulum needle indicator having two ends, with a tip at one end and a weight at the other end, and rotatably mounted at a point in the mid-region of the needle indicator to the inside of the first face of the housing such that when the faces of the housing are substantially vertically oriented the rotational position of the needle indicator will be primarily influenced by gravity alone, and not by the rotational position of the housing;

an attachment means fixedly mounted to the first face of the housing for removably mounting said housing to a rotor;

a viewport fixedly mounted to the second face of the housing such that the needle indicator mounted within the housing may be viewed from without the housing;

a first set of indicia, having a first distinguishing characteristic, on the inside of the first face of the housing such that it can be viewed behind the needle indicator when looking through the viewport, the indicia forming a ring, the radius of which is approximately equal to the length of the needle indicator from the tip thereof to the point at which it is rotatably mounted, and having tick marks equally spaced around the circumference of the ring which they form;

a second set of indicia disposed in a ring adjacent to said tick marks, having a second distinguishing characteristic, on the inside of the first face of the housing such that said second set can be viewed behind the needle indicator when looking through the viewport, and having a plurality of numbers, indicating a zero position and indicating angles extending away from the zero position in a first direction corresponding to the operational rotation direction of the rotor;

a third set of indicia disposed in a ring adjacent to said tick marks, having a third distinguishing characteristic, on the inside of the first face of the housing such that it can be viewed behind the needle indicator when looking through the viewport, and having a plurality of numbers, indicating the zero position and indicating angles extending away from the zero position in a second direction opposite from the first direction, said second direction corresponding to an against rotation direction that is opposite from the operational rotational direction;

a first arc shaped arrow, having the second distinguishing characteristic, positioned adjacent to and substantially concentric to the tick marks, and pointing in the second direction, for indicating that said second set of indicia should be used to rotationally position the rotor when the operational rotational direction is the second direction; and a second arc shaped arrow, positioned adjacent to and substantially concentric to the tick marks, having the third distinguishing characteristic, and pointing in the first direction opposite from the second direction, for indicating that said third set of indicia should be used to rotationally position the rotor when the operational rotational direction is the first direction.

7. The instrument of claim 6 wherein the first, second, and third distinguishing characteristics further comprise different colors.

8. The instrument of claim 7 wherein the first color and second color are black, and the third color is red.

9. The instrument of claim 6 wherein the second and third sets of indicia further comprise the numbers from 0 to 359 inclusive required to label the first tick mark of the first set of indicia as zero, and every tenth tick mark thereafter.

10. The instrument of claim 6 further comprising a fourth set of indicia on the viewport, having words of instruction indicating that the decision as to which of the second or third sets of indicia to be used for properly determining the resultant rotational position, is to be made by choosing that set of indicia which has the same distinguishing characteristic as the arc shaped arrow that points in the operational rotational direction.

* * * * *